(12) United States Patent
Roulet et al.

(10) Patent No.: US 12,238,428 B2
(45) Date of Patent: *Feb. 25, 2025

(54) METHOD TO DESIGN MINIATURE LENSES WITH ON-PURPOSE DISTORTION

(71) Applicant: ImmerVision, Inc., Montreal (CA)

(72) Inventors: Patrice Roulet, Montreal (CA); Pierre Konen, Saint-Bruno (CA); Jocelyn Parent, Lavaltrie (CA); Simon Thibault, Quebec City (CA); Xavier Dallaire, Verdun (CA); Zhenfeng Zhuang, Montreal (CA)

(73) Assignee: IMMERVISION, INC., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,241

(22) Filed: Apr. 24, 2023

(65) Prior Publication Data

US 2023/0269493 A1    Aug. 24, 2023

Related U.S. Application Data

(63) Continuation of application No. 16/924,459, filed on Jul. 9, 2020, now Pat. No. 11,659,287.

(Continued)

(51) Int. Cl.
*H04N 23/80* (2023.01)
*G02B 13/00* (2006.01)
*G06T 5/80* (2024.01)

(52) U.S. Cl.
CPC ....... *H04N 23/815* (2023.01); *G02B 13/0045* (2013.01); *G06T 5/80* (2024.01)

(58) Field of Classification Search
None
See application file for complete search history.

(56) References Cited

U.S. PATENT DOCUMENTS

| | | | |
|---|---|---|---|
| 2006/0198622 A1 | 9/2006 | Xu et al. | |
| 2008/0137980 A1* | 6/2008 | Mizuno | G06T 5/80 |
| | | | 382/255 |

(Continued)

FOREIGN PATENT DOCUMENTS

| | | | |
|---|---|---|---|
| CN | 102779195 A | 11/2012 | |
| CN | 108663780 A * | 10/2018 | ......... G02B 13/0045 |

(Continued)

OTHER PUBLICATIONS

Int'l Search Report and Written Opinion issued Sep. 22, 2020 in Int'l Application No. PCT/IB2020/056390.

(Continued)

*Primary Examiner* — Quan Pham
(74) *Attorney, Agent, or Firm* — Panitch Schwarze Belisario & Nadel LLP

(57) ABSTRACT

A method to design miniature wide-angle and ultra-wide-angle lenses by using on-purpose distortion to have shorter focal length than usual for a given image sensor size and a desired image projection. This results in optical systems having miniaturization ratio, defined as the ratio between the total track length and the image footprint diameter, smaller than 0.8. The resulting image from these systems having on-purpose distortion can then be processed with a processor to remove the on-purpose distortion and to output an image with the targeted distortion profile.

20 Claims, 11 Drawing Sheets

Related U.S. Application Data

(60) Provisional application No. 62/871,978, filed on Jul. 9, 2019.

(56) References Cited

U.S. PATENT DOCUMENTS

| | | | |
|---|---|---|---|
| 2012/0099005 A1* | 4/2012 | Kali | H04N 25/61 |
| | | | 348/240.99 |
| 2012/0314296 A1 | 12/2012 | Shabtay et al. | |
| 2014/0239073 A1 | 8/2014 | Toyoda et al. | |
| 2015/0085135 A1 | 3/2015 | Chen et al. | |
| 2015/0363921 A1 | 12/2015 | Baek et al. | |
| 2016/0139368 A1* | 5/2016 | You | G02B 9/62 |
| | | | 359/713 |
| 2017/0184813 A1 | 6/2017 | Parent et al. | |
| 2019/0025475 A1 | 1/2019 | Piskunov et al. | |
| 2019/0064483 A1 | 2/2019 | Chen et al. | |
| 2019/0187442 A1 | 6/2019 | Jia et al. | |

FOREIGN PATENT DOCUMENTS

| | | |
|---|---|---|
| CN | 208806870 U | 4/2019 |
| CN | 110262017 A | 9/2019 |
| JP | 2011180545 A | 9/2011 |

OTHER PUBLICATIONS

Int'l Preliminary Report on Patentability issued Jan. 20, 2022 in Int'l Application No. PCT/IB2020/056390.
Notice of Allowance issued Jan. 19, 2023 in U.S. Appl. No. 16/924,459.

* cited by examiner

METHOD TO DESIGN MINIATURE LENSES WITH ON-PURPOSE DISTORTION

CROSS-REFERENCE TO RELATED APPLICATIONS

The present application is a continuation of U.S. patent application Ser. No. 16/924,459, filed on Jul. 9, 2020, entitled "Method to Design Miniature Lenses with On-Purpose Distortion," currently pending, which claims the benefit of U.S. Provisional Patent Application No. 62/871,978, filed on Jul. 9, 2019, entitled "Method to Design Miniature Lenses with On-Purpose Distortion," the entire contents of all of which are incorporated by reference herein.

BACKGROUND OF THE INVENTION

Embodiments of the present invention relate to the field of optical lenses and their design and more particularly to panoramic miniature lenses having wide-angle field of view of about 60° or more used in combination with image processing.

Design of imaging lenses for use inside modern smartphones or other applications with limited space all have the challenge of requiring large image footprint diameter while keeping the smallest lens total thickness possible, also known as the total track length (TTL) in the field of optical design. Especially in modern smartphones or consumer electronics, the thickness of the lenses is usually limited to values of total track length under 10 mm to avoid the lens sticking out of the thin devices. As for the image footprint diameter, with the trend of image sensors having more and more megapixels, the trend on their size is also going up. As such, there is a requirement to have lenses with miniaturization ratio, defined as the ratio between the total track length and the image footprint diameter, as small as possible.

For existing wide-angle lenses with total field of view between 60° and 100° and ultra-wide-angle lenses with total field of view between 100° and 170°, the miniaturization ratio is generally 0.8 or higher. For a fixed image sensor size, requiring a fixed image footprint half-diameter having an height H, this miniaturization ratio is generally limited by the required focal length f of the lens in order to follow a rectilinear projection H=f*tan(θ) as is often required in mobile phones since it is often believed to be the most pleasant vision.

A new method to design miniature wide-angle lenses and ultra-wide-angle lenses is required to achieve miniaturization ratios smaller than 0.8, especially when the lenses are used in combination with image processing to enhance the display projection of the image when it is not adequate for pleasant viewing.

BRIEF SUMMARY OF THE INVENTION

To overcome all the previously mentioned issues, embodiments of the present invention present a method to design wide-angle or ultra-wide-angle optical systems with miniaturization ratio smaller than 0.8. From this invention, a wide-angle optical system is considered as an optical system having a full field of view between approximatively 60° and 100° and an ultra-wide-angle optical system is considered as an optical systems having a full field of view between approximatively 100° and 170°. However, both the 60° inferior limit and the 170° superior limit for these two categories are example of usual range and are not absolute values limiting the idea of the present invention. The wide-angle and ultra-wide-angle optical systems are also called panoramic optical systems since their wide field of view allow to capture a large part of the scene with a single capture. The miniaturization ratio is defined as the ratio between the total track length (TTL) and the image footprint diameter of these optical systems. The optical systems can be of any kind, including pure lenses using only refraction to guide light from the object to the image, optical systems using a combination of refraction and refraction, optical systems using diffractive optical element, optical systems with meta-material or meta-surfaces or the likes. In a preferred embodiment, the optical system is an optical lens consisting only of lens element.

To reduce the miniaturization ratio, the designed wide-angle or ultra-wide-angle lens can either do so by reducing the total track length or increasing the image footprint diameter. However, for a given lens design, the image sensor is often specified by the application since the number of pixels and the size of the pixels define what can be achieved with this optical system. The only remaining way to reduce the miniaturization ratio is to lower the total track length of the system. To do so, the method of the current invention reduce on-purpose the focal length of the system in order to get a smaller total track length and achieve a miniaturization ratio under 0.8. In miniature wide-angle and ultra-wide-angle lenses, the focal length is reduced by at least 10% compared to the focal length of the system creating the target projection for a given image sensor, resulting in a resolution in the center at least 10% lower than the resolution of the target resolution curve.

In some embodiments, the method according to the present invention is used to design extreme miniature wide-angle or extreme miniature ultra-wide-angle lenses, in which the focal length can be further reduced to at least 15% lower than the focal length of the system required for the target projection on a given image sensor or even at least 20% lower than the focal length of the system creating the target projection. In some other embodiments of extreme miniature wide-angle or extreme miniature ultra-wide-angle lenses, not necessarily related to the above designs with reduced focal length, the miniaturization ratio is lower than 0.7. In some other embodiments, the method of the present invention is pushed even further, and the miniaturization ratio is at least lower than 0.6 or even lower than 0.5.

In addition to having a smaller focal length, resulting in a lower resolution in the center of the field of view, for the image to cover the same image footprint diameter on the image plane for a fixed total field of view, the reduction of focal length creating a compression zone in the center is combined with on-purpose distortion to create at least one expanded zone in the rest of the field of view where the resolution of the designed lens is larger than the target resolution for the application.

Once the miniature wide-angle or miniature ultra-wide-angle lens according to the present invention is designed and fabricated, it can be used in a camera system to create an image on an image sensor with on-purpose distortion to create a compressed zone in the center and at least one expanded zone in the rest of the field of view. This image sensor is used to create a digital image file of the optical image from the lens with on-purpose distortion. This original digital image file can then be used in combination with an image processing and dewarping algorithm to create a processed and dewarped image in which the resolution profile has been transformed from the original to the target resolution profile. The algorithm can also be used to execute other image processing operations in order to further improve the image quality of the outputted image. Finally, the outputted image from the algorithm unit can either be displayed to a human observer or used automatically inside a calculation unit without a human viewing the image.

In some other embodiments of the present invention, instead of using the image sensor to create a digital image file with on-purpose distortion on which image processing and dewarping algorithm is applied, the dewarping can be done directly by the image sensor. One way the sensor can do the dewarping directly is by transforming directly the pixels read during a line by line scanning, a circle by circle scanning or adapted pixel scanning so that the output signal from the sensor is already dewarped. One other way the sensor can do the dewarping directly is by smart binning, in which the image sensor can for example apply a different binning in the center than at the edge. It could be a 1×1 pixel (no binning) in the center and increasing to 1.5×1.5 pixels or 2×2 pixels toward the edges. The smart binning could also use non-symmetrical binning, like a 1×2 or a 2×1 pixels binning. By doing this smart binning at the analog sensor level instead of by software image processing, the resulting signal over noise ratio is improved. Finally, the dewarping could be done by the sensor by using an image sensor with pixels of increasing size toward the edge. For example, the pixels in the center could be square of 1×1 μm, but toward the edge the size could be larger than 1 μm or the shape could be different from square pixels.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
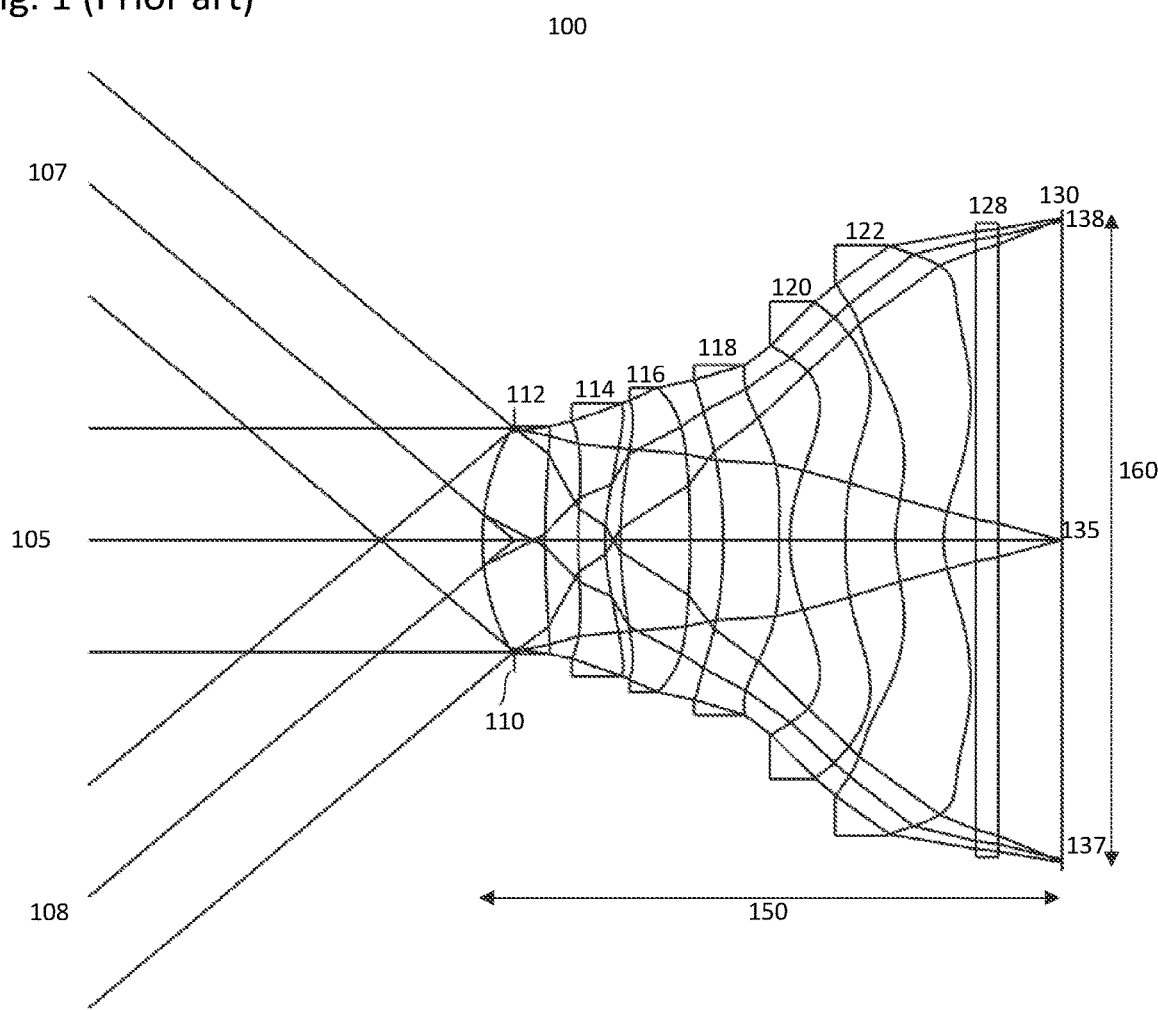
FIG. 1 shows the optical layout of an existing 80° wide-angle lens having a miniaturization ratio of 0.9.

FIG. 1 shows the layout 100 of a typical wide-angle lens used in a mobile phone application according to prior art. The lens has an object side on the left of the layout and an image side on the right of the layout. In this example layout, the optical design consists of an aperture stop 110, six plastic aspherical elements 112, 114, 116, 118, 120 and 122, a sensor cover glass that could also act as a filter 128 and an image plane 130. The rays 105 coming from the object in a direction perpendicular to the image plane 130 represent a central field of view on the optical axis of the lens, corresponding to a field of view of 0°. The rays 107 and 108 coming from the object with an oblique incidence relative to the image plane 130 define the maximum half field of view of the lens. In this example, these rays 107 and 108 are at an angle of ±40° with respect to the optical axis, representing a full field of view of 80°. This is an example value often found in the prior art, but from now on, a wide-angle lens is considered as a lens having a full field of view between approximatively 60° and 100°. The lens in the optical layout 100 has a total track length, represented as the distance from either the object side vertex of the first optical element 112 or the aperture stop 110, whichever is more on the object side, to the image plane 130 and is represented on the layout by the length 150. In this example, the aperture stop is in front of the first plastic optical element, but the vertex of L1 is still more on the object side of the lens compared to the aperture stop and the vertex of L1 is used to limit the total track length. In some other wide-angle lenses, the aperture stop could be located after the first optical element. In that case where the aperture stop would be on the image side relative to the first element 112, the total track length 150 would be measured from the apex of the first optical element 112 to the image plane 130. The lens also has an image footprint diameter 160, represented by the distance on the image plane 130 between the location 137 where the rays from direction 107 hit the image plane and the location 138 where the rays from direction 108 hit the image plane. In the example layout 100, the miniaturization ratio of these wide-angle lens, defined as the ratio between the total track length 150 and the image footprint diameter 160 is equal to 0.9. For existing wide-angle lenses with total field of view between 60° and 100°, the miniaturization ratio is above 0.8 and is generally limited by the required focal length f of the lens to in order to follow a rectilinear projection $H=f*\tan(\theta)$ up to the height H of the half image footprint diameter as will be described with FIG. 2.

Figure 2:
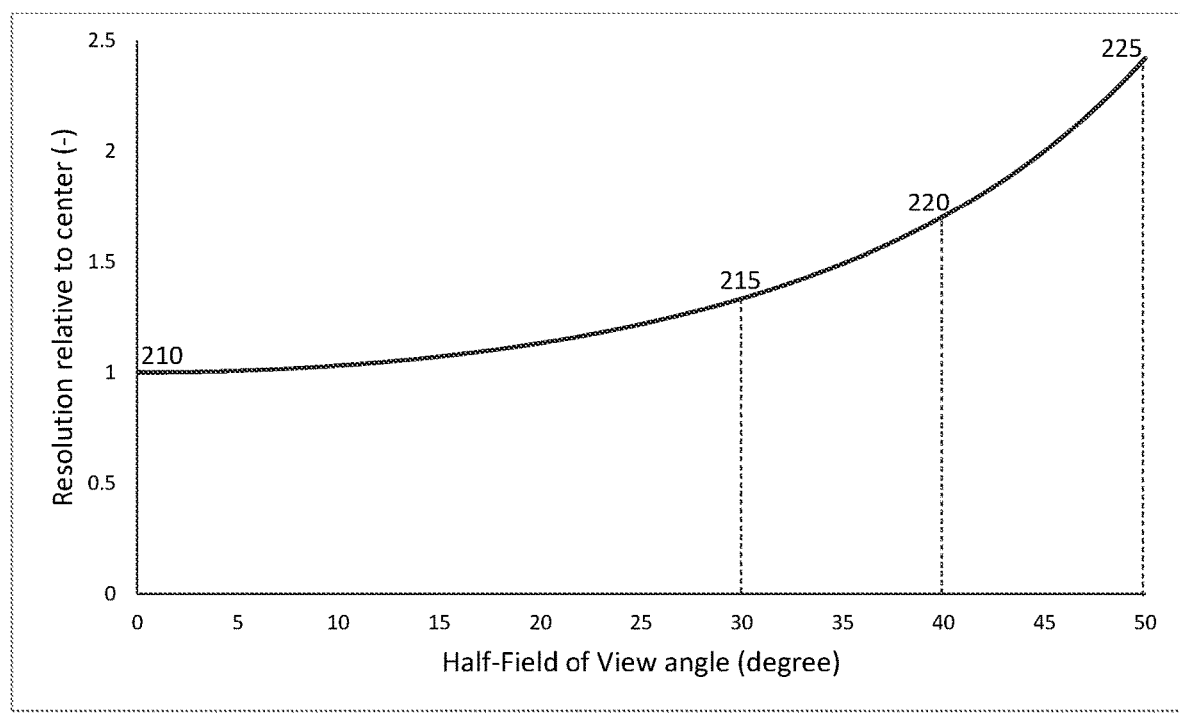
FIG. 2 shows a typical resolution curve for an existing 80° wide-angle lens having a miniaturization ratio >0.8.

FIG. 2 shows the usual target resolution curve 200 in existing wide-angle lenses used in mobile phones according to prior art. For simplicity, the resolution curve 200 is normalized with respect to the value at a field of view angle of 0°. The resolution curve is the mathematical derivative of the position curve, also known as the object-image mapping function or distribution function, with respect to the field angle θ and is also called the magnification curve. For wide-angle lenses with a full field of view between 60° and 100°, the lenses generally follow as closely as possible the rectilinear projection H=f*tan(θ) for the object-image mapping function, where H is the image height on the image plane measured from the optical axis, f is the focal length of the optical system and θ is the field of view angle. In the graph 200, the resolution in the center, at a field angle of 0°, is represented by the normalized value 210 and is equal to the focal length f when the resolution before normalization is expressed in mm/radian. This resolution before normalization is also often written in pixels/degree using the sensor pixel size. For a perfect rectilinear lens, the normalized value 215 at a half field of view angle of 30° is 1.33, the normalized value 220 at a half field of view angle of 40° is 1.70 and the normalized value 225 at a half field of view angle of 50° is 2.42. Departure from this ideal projection is generally called optical distortion. Optical distortion is usually calculated with the formula $$\text{Distortion}(\%) = 100 \frac{H_{real} - H_{ideal}}{H_{ideal}}$$

Where $H_{real}$ is the real image height of a given chief-ray and $H_{ideal}$ is the image height that would have the same chief-ray in a perfect H=f*tan(θ) lens. The distortion is usually kept bellow ±5% in wide-angle lenses used in mobile phones in order to keep straight lines in the object scene imaged as straight lines in the image. When the image footprint of a wide-angle lens must cover the full diagonal of an image sensor and the total field of view is a fixed requirement, the required focal length f of the system can be calculated in order to get a lens without distortion. For example, for a common ⅓" image sensor having a diagonal dimension of 6.0 mm, the maximum image height from the center to the corner of the sensor would be 3.0 mm. If the total field of view for this lens is 80°, the maximum half field of view is then 40° and by solving for f in the rectilinear projection equation, we get that the focal length must be ≈3.58 mm. While the focal length of a lens is not directly related to the total track length of this lens, it generally follows that when a longer focal length is required, a longer total track length is required for a similar construction with similar performances since a longer focal length results in rays with smaller field angles and hence more track length is required to form a focused image.

Figure 3:
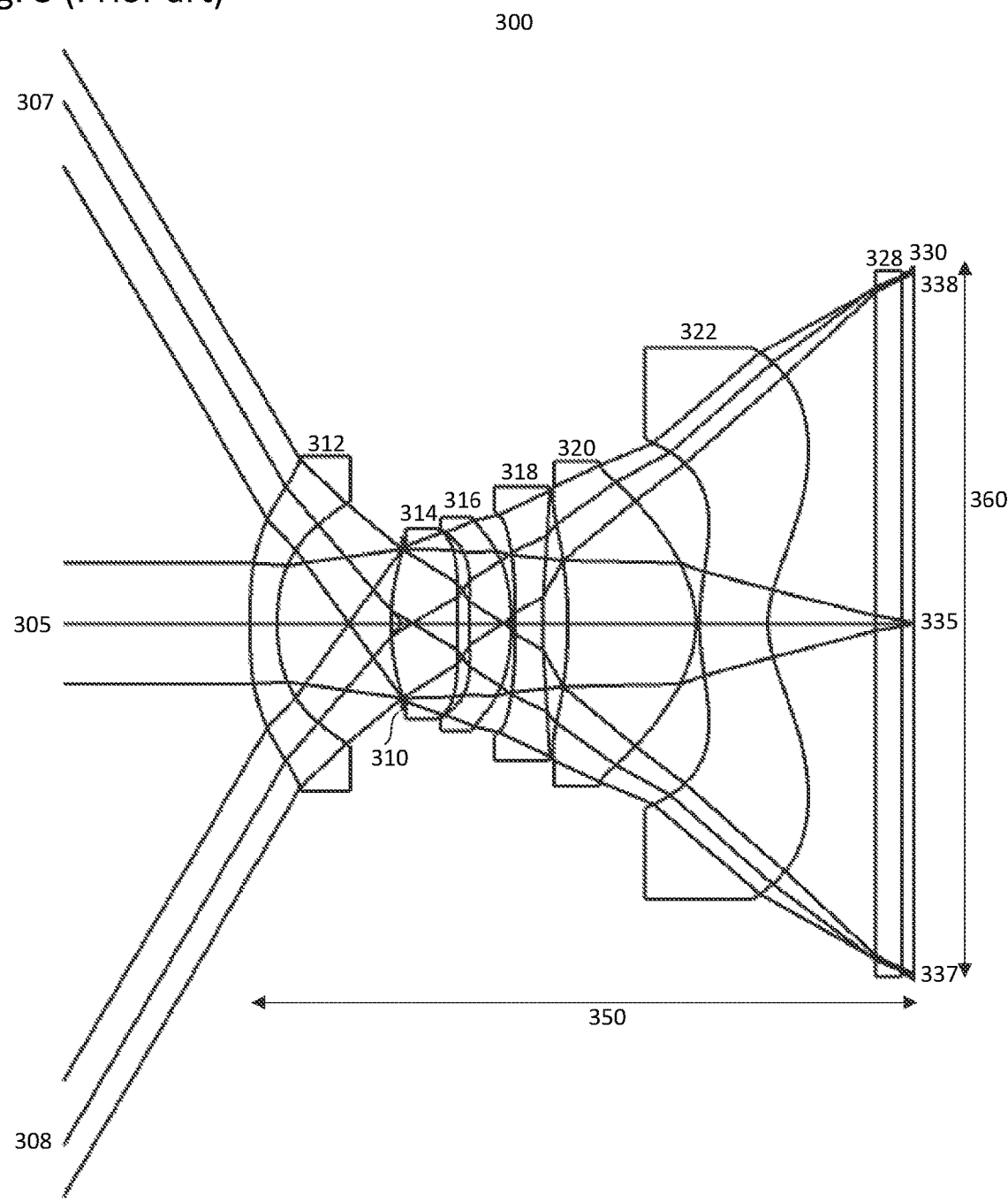
FIG. 3 shows the optical layout of an existing 120° ultra-wide-angle lens having a miniaturization ratio of 0.9.

FIG. 3 shows the layout 300 of a typical ultra-wide-angle lens used in a mobile phone application according to prior art. The lens has an object side on the left of the layout and an image side on the right of the layout. In this example layout, the optical design consists from the object side to the image of a first plastic aspherical lens element 312, an aperture stop 310, five other plastic aspherical elements 314, 316, 318, 320 and 322, a sensor cover glass that could also act as a filter 328 and an image plane 330. The rays 305 coming from the object in a direction perpendicular to the image plane 330 represent a central field of view on the optical axis of the lens, corresponding to a field of view of 0°. The rays 307 and 308 coming from the object with an oblique incidence relative to the image plane 128 define the maximum half field of view of the lens. In this example, these rays 307 and 308 are at an angle of ±60° with respect to the optical axis, representing a full field of view of 120°. This is an example value often found in the prior art, but from now on, an ultra-wide-angle lens is considered as a lens having a full field of view between approximatively 100° and 170°. The lens in the optical layout 300 has a total track length, represented as the distance from the vertex of the first optical element 312 to the image plane 330 and is represented on the layout by the length 350. In this example, the aperture stop is between the first and the second plastic optical element, but in some other ultra-wide-angle lenses, the aperture stop could be located before the first optical element, after the second optical element or at any other location after. In that case where the aperture stop would to the left of the first element 312, the total track length 350 would be measured from the aperture stop 310 to the image plane 330. The lens also has an image footprint diameter 360, represented by the distance on the image plane 330 between the location 337 where the rays from direction 307 hit the image plane and the location 338 where the rays from direction 308 hit the image plane. In the example layout 300, the miniaturization ratio of these ultra-wide-angle lens, defined as the ratio between the total track length 350 and the image footprint diameter 360 is equal to 0.9. For existing ultra-wide-angle lenses with total field of view between 100° and 170°, the miniaturization ratio is above 0.8 and is generally limited by the required focal length of the lens to in order to limit the distortion as will be described with FIG. 4.

Figure 4:
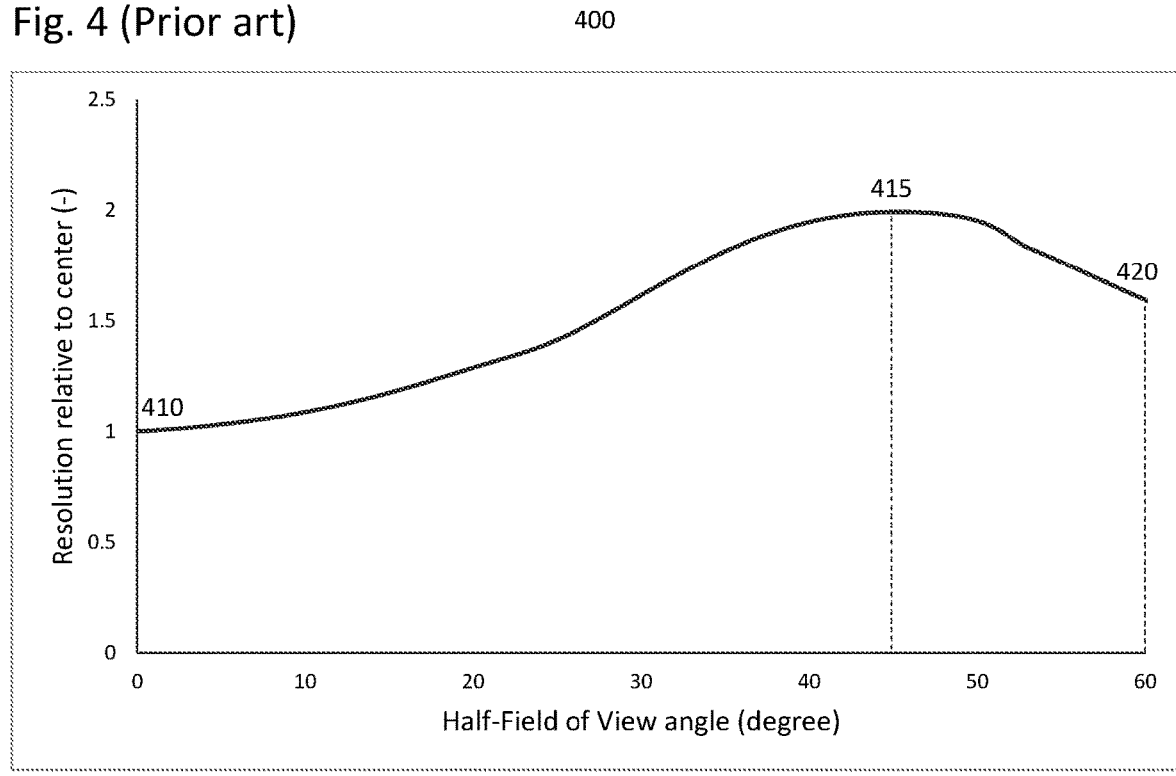
FIG. 4 shows a typical resolution curve for an existing 120° ultra-wide-angle lens having a miniaturization ratio >0.8.

FIG. 4 shows a typical target resolution curve 400 in an existing 120° full field of view ultra-wide-angle lenses used in mobile phones according to prior art. For simplicity, the resolution curve 400 is normalized with respect to the value at a field of view angle of 0°. The resolution curve is the mathematical derivative of the position curve, also known as the object-image mapping function or distribution function, with respect to the field angle θ and is also called the magnification curve. For ultra-wide-angle lenses with a full field of view between 100° and 170°, the lenses generally follow as closely as possible the same rectilinear projection H=f*tan(θ) as FIG. 2 up to a maximum value around a half field of view angle of about 40° to 50° and then is increasingly below the rectilinear projection (negative distortion). In the graph 400, the resolution in the center, at a field angle of 0°, is represented by the normalized value 410 and is equal to the focal length f when the resolution before normalization is expressed in mm/radian. This resolution before normalization is also often written in pixels/degree using the sensor pixel size. The value of the normalized resolution at the maximum is given by value 415 and the value at the edge is given by 420. As was the case with the wide-angle, with the ultra-wide-angle lens, the resolution value in the center (its focal length when calculated in mm/radian) is not directly related to the total track length of this lens, but it generally follows that when a longer focal length is required, a longer total track length is required for a similar construction with similar performances. Hence, the required resolution in the center put a limit to the minimum dimension of the total track length.

Figure 5:
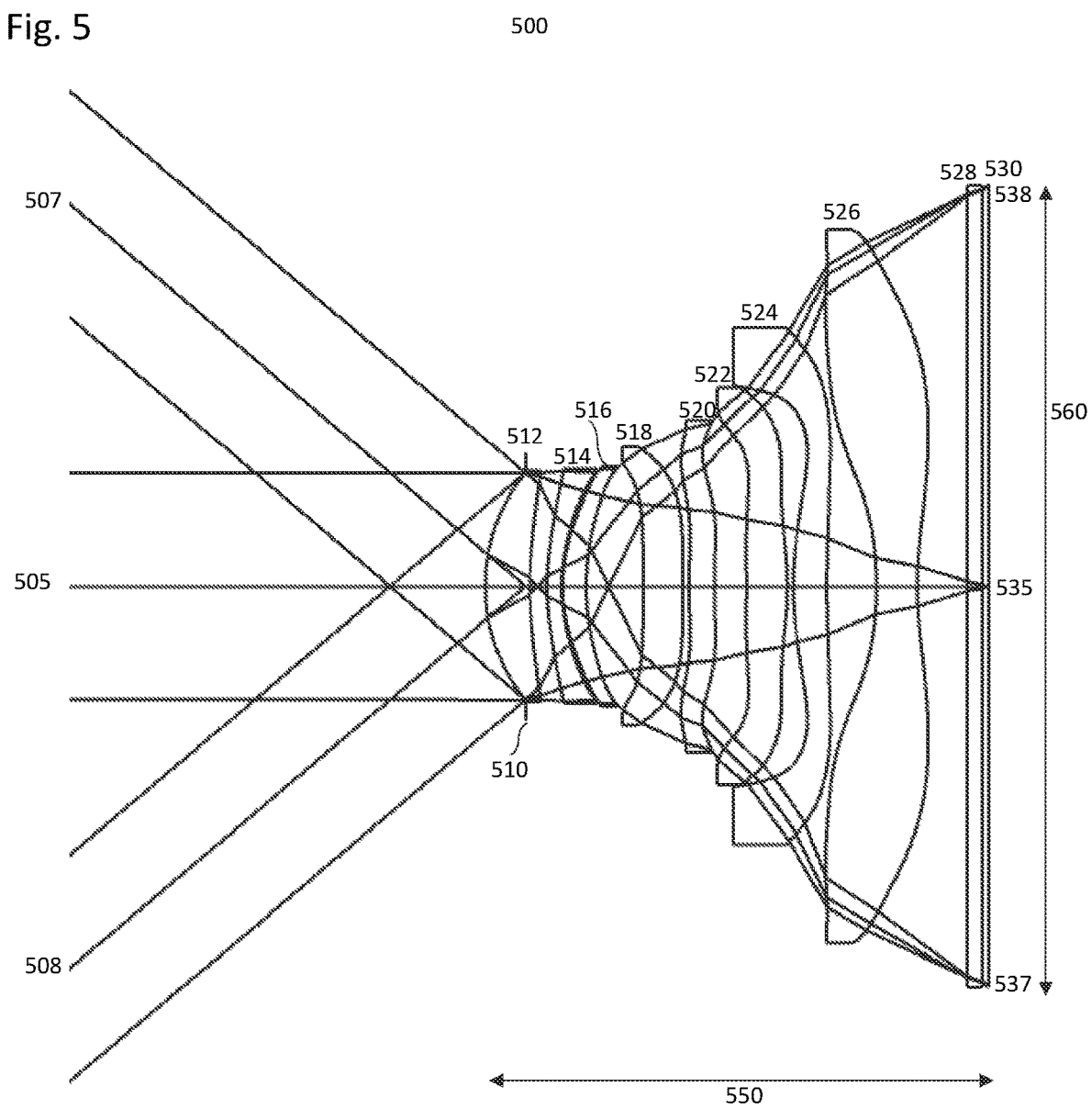
FIG. 5 shows an example optical layout of a miniature 80° wide-angle lens having a miniaturization ratio of 0.6.

FIG. 5 shows an example layout 500 of a wide-angle lens with small miniaturization ratio by using on-purpose distortion according to the present invention. In this example layout, the optical design consists of an aperture stop 510, eight plastic aspherical elements 512, 514, 516, 518, 520, 522, 524 and 526, a sensor cover glass that could also act as a filter 528 and an image plane 530. However, this construction is just an example embodiment according to the present invention and the method to design lenses with small miniaturization ratio is not limited to any number of optical elements, any specific material or any lens shape. For example, in other constructions according to the present method, the layout could have less or more than eight optical elements, could include elements in glass, in crystal or other materials and could include spherical elements, freeform elements, mirror, diffractive elements, elements with metasurfaces or any other optical element that can be used to help form an image from the object, including active deformable elements. The rays 505 coming from the object in a direction perpendicular to the image plane 530 represent a central field of view on the optical axis of the lens, corresponding to a field of view angle of 0°. The rays 507 and 508 coming from the object with an oblique incidence relative to the image plane 530 define the maximum half field of view of the lens. In this example, these rays 507 and 508 are at an angle of ±40° with respect to the optical axis, representing a full field of view of 80°. This value of 80° is an example full field of view for a miniature wide-angle lens according to the present invention, but the method is not limited to a wide-angle or ultra-wide-angle field of view and can also be applied to lenses having field of view smaller than 60° or larger than 170°. The lens in the optical layout 500 has a total track length, represented as the distance from either the object side vertex of the first optical element 512 or the aperture stop 510, whichever is more on the object side, to the image plane 530 and is represented on the layout by the length 550. In this example, the aperture stop is in front of the first plastic optical element, but the vertex of L1 is still more on the object side of the lens compared to the aperture stop and the vertex of L1 is used to limit the total track length. In some other wide-angle lenses, the aperture stop could be located after at least one optical element. In that case where the aperture stop would not be the first element, the total track length 550 would be measured from the apex of the first optical element 512 to the image plane 530. The rays from directions 507 and 508 converge to form an image at the image plane 530 each in a small region represented respectively by positions 537 and 538. In each bundle of rays coming from directions 505, 507 and 508, there is a chief-ray which pass through the center of the aperture stop 510. In the region between the sensor coverglass 528 and the image plane 530, generally an air space, the chief-rays hitting the image plane at 537 and 538 each have an incident angle with respect to the chief-ray hitting the image plane at 535, which is generally the optical axis of the system. This angle is often called the chief-ray angle. In some embodiments of miniature wide-angle lenses according to the present invention, the maximum chief-ray angle is over 20°, meaning that the rays hitting at 537 and 538 form a total opening angle of at least 40°. The lens also has an image footprint diameter 560, represented by the distance on the image plane 530 between the location 537 where the rays from direction 507 hit the image plane and the location 538 where the rays from direction 508 hit the image plane. In the example layout 500, the miniaturization ratio of these miniature wide-angle lens, defined as the ratio between the total track length 550 and the image footprint diameter 560 is equal to 0.6. For miniature wide-angle lenses according to the present invention, the miniaturization ratio is below 0.8 by using a focal length at least 10% smaller than what is required for the target distortion profile as will be explained with respect to FIG. 6. When the method according to the present invention is pushed further, the miniaturization ratio in extreme miniature wide-angle lenses is below 0.7. In some other embodiments, to achieve even smaller total track length for a required image diameter, the miniaturization ratio is below 0.6 or even below 0.5. For these extreme miniature wide-angle lenses, the focal length can be at least 15% smaller or even at least 20% smaller than what is required for the target distortion profile. Furthermore, with lenses designed according to the method of the present invention, a local telephoto ratio (LTR) can be defined as the ratio between the total track length (TTL) of the lens by the local focal length (LFL) of the lens. The local focal length is defined as the mathematical derivative dH/dθ, where H is the image height in mm and θ is the field of view angle in radians and is equal the traditional effective focal length in the center, where the field of view angle is 0°. Since the local focal length has a defined value at each field of view angle, the local telephoto ratio also has a defined value that can vary with the field of view angle. With lenses designed according to the method of the present invention, the local telephoto ratio is higher in the center than at the field of view angle with the largest resolution by at least 10%. In other embodiments, this LTR is even at least 15% or at least 20% higher in the center than at the field of view with the maximum resolution in order to reach the desired miniaturization ratio.

Figure 6:
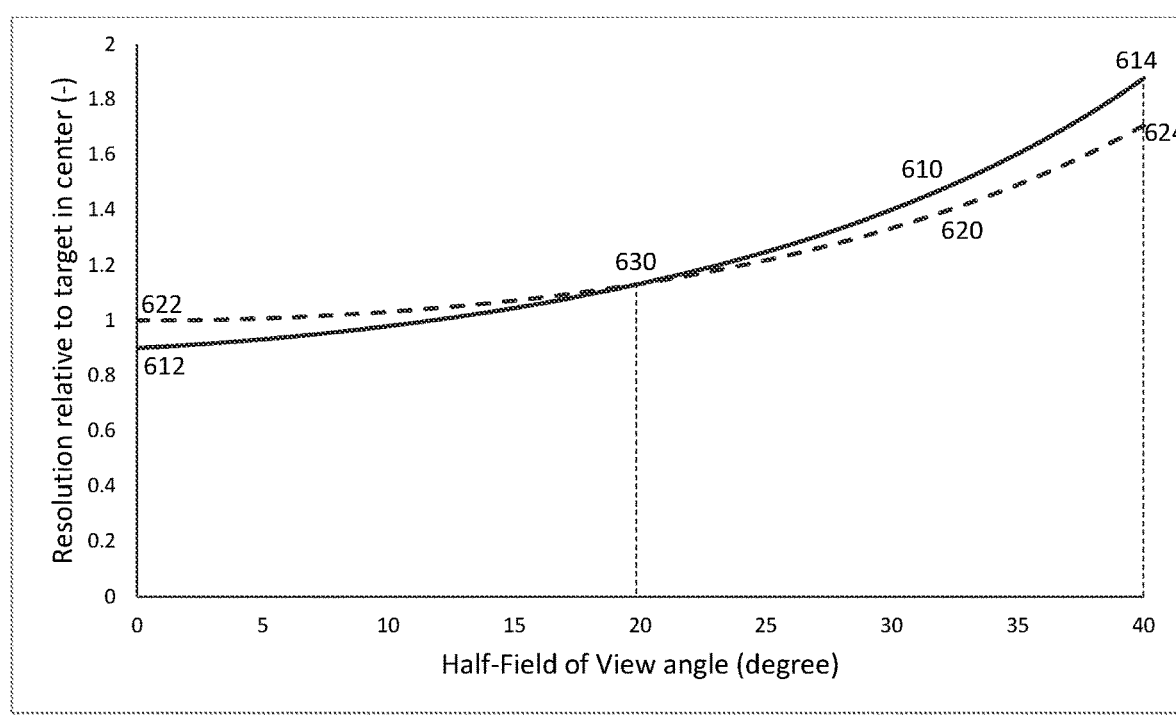
FIG. 6 shows an example resolution curve for a miniature 80° wide-angle lens having a miniaturization ratio <0.8 compared to the target resolution curve after image processing.

FIG. 6 shows a graph 600 of the normalized original resolution curve 610 (full line) for a 80° full field of view miniature wide-angle lens designed according to the method of the present invention in comparison to the target resolution curve 620 (dashed line) after image processing is used. This target resolution curve 620 also represents the case of a wide-angle lens not designed according to the method of the present invention to lower the miniaturization ratio as in FIG. 2. The value 612 represents the original resolution of the lens designed according to the method of the present invention in the center of the field of view and is at least 10% lower than the target resolution value 622 of the target resolution curve because the focal length is at least 10% smaller than what is required for an ideal rectilinear lens. This create a zone of compression in the center of the image. In some other embodiments of the current invention, for extreme miniature wide-angle lenses, since the focal length can be at least 15% smaller or even at least 20% smaller than what is required for the target projection, the designed lens original resolution 612 is at least 15% smaller than the target resolution 622 or even at least 20% smaller than the target resolution 622. Since the original resolution in the center is smaller and the image sensor size is fixed, this smaller original resolution in the center creating a compressed zone in the center is combined to a at least one zone of expansion in the remaining part of the field of view. With the example resolution curves 600 of FIG. 6, the original resolution curve 610 of the lens according to the present invention is equal to the target resolution curve 620 at a single location 630. This location of equal resolution 630 separates the zone of compression, located from the center of the field of view to this location of equal resolution 630, from the zone of expansion, located from this location of equal resolution 630 to the edge of the field of view. This case with only one location of equal resolution 630 where the original resolution of the designed miniature wide-angle lens and the target resolution curve are equal is just an example, but in other miniature wide-angle lenses designed according to the present method, there could be more than one such point of equal resolution. In the expansion zone, there is at least one location where the resolution departure between the original resolution curve 610 for the designed miniature wide-angle lens and the target resolution curve 620 for the target projection is a local maximum. In this example of FIG. 6, a local maximum resolution departure is at the edge of the field of view, where the half-field of view angle θ is equal to 40°, but a local maximum resolution departure could be located at any location in the expansion zone according to the present invention. At the location of at least one local maximum resolution departure, the original resolution value 614 of the designed miniature wide-angle lens is at least 10% larger than the target resolution value 624. In extreme miniature wide-angle lenses, the original resolution value 614 could be at least 15% higher than the target resolution value 624 or even at least 20% higher than the target resolution value 624. The captured image on the image sensor with the original resolution curve 610 from the designed miniature wide-angle lens will then be processed to an image with the target resolution curve 620 using the method that will be described with respect to FIG. 9 or FIG. 10.

Figure 7:
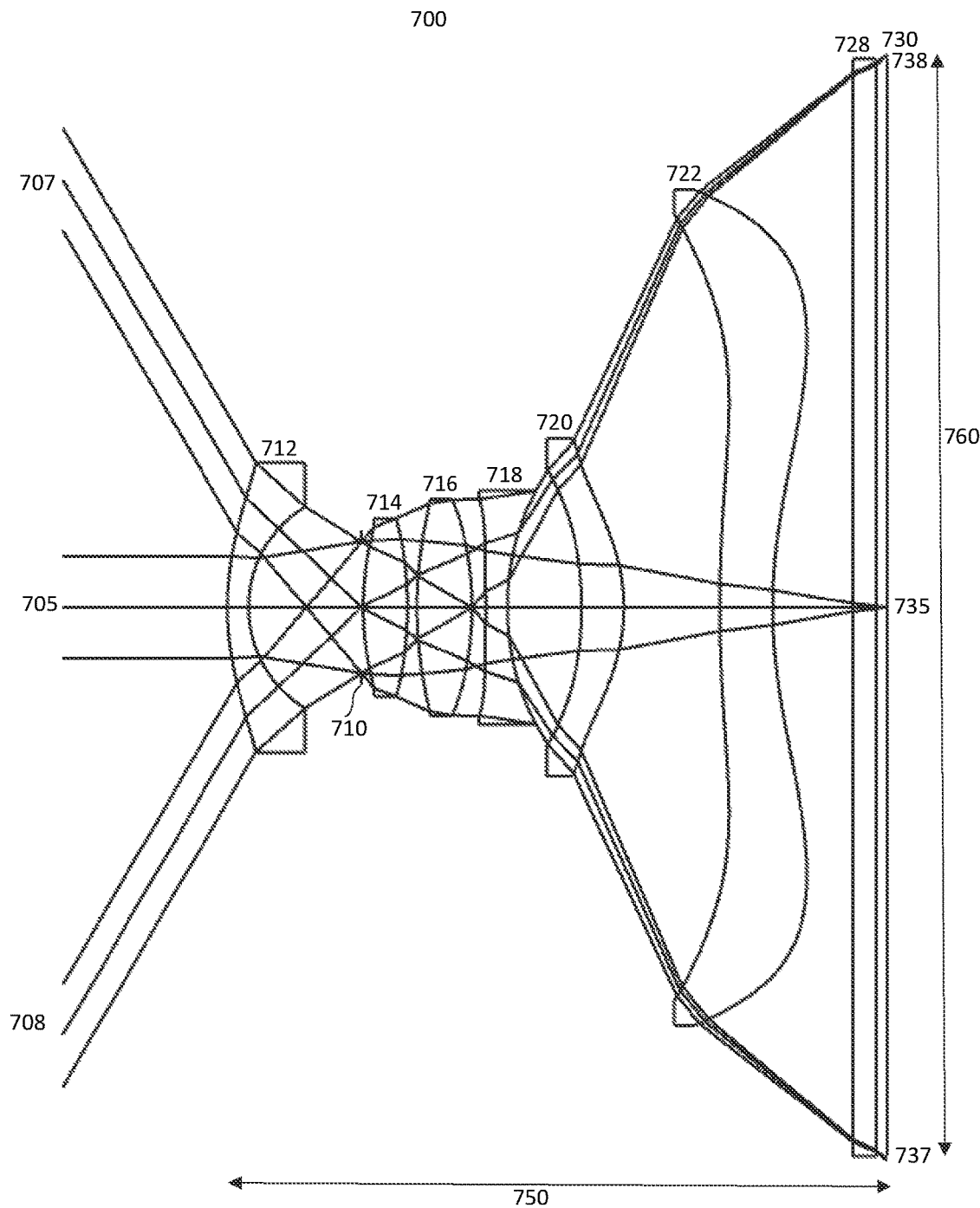
FIG. 7 shows an example optical layout of a miniature 120° ultra-wide-angle lens having a miniaturization ratio of 0.6.

FIG. 7 shows an example layout 700 of an ultra-wide-angle lens with small miniaturization ratio by using on-purpose distortion according to the present invention. In this example layout, the optical design consists of an aperture stop 710, six plastic aspherical elements 712, 714, 716, 718, 720 and 722, a sensor cover glass that could also act as a filter 728 and an image plane 730. However, this construction is just an example embodiment according to the present invention and the method to design miniature ultra-wide-angle lenses with small miniaturization ratio is not limited to any number of optical elements, any specific material or any lens shape. For example, in other constructions according to the present method, the layout could have less or more than six optical elements, could include elements in glass or other materials and could include spherical elements, freeform elements, mirror, diffractive elements, elements with metasurfaces or any other optical element that can be used to help form an image from the object, including active deformable elements. The rays 705 coming from the object in a direction perpendicular to the image plane 730 represent a central field of view on the optical axis of the lens, corresponding to a field of view angle of 0°. The rays 707 and 708 coming from the object with an oblique incidence relative to the image plane 730 define the maximum half field of view of the lens. In this example, these rays 707 and 708 are at an angle of ±60° with respect to the optical axis, representing a full field of view of 120°. This value of 120° is an example full field of view for a miniature ultra-wide-angle lens according to the present invention, but the method is not limited to a wide-angle or ultra-wide-angle field of view and can also be applied to lenses having field of view smaller than 60° or larger than 170°. The lens in the optical layout 700 has a total track length, represented as the distance from the vertex of the first optical element 712 to the image plane 730 and is represented on the layout by the length 750. In this example, the aperture stop is between the first and the second plastic optical element, but in some other ultra-wide-angle lenses, the aperture stop could be located before the first optical element, after the second optical element or at any other location after. In that case where the aperture stop would to the left of the first element 712, the total track length 750 would be measured from the aperture stop 710 to the image plane 730. The rays from directions 707 and 708 converge to form an image at the image plane 730 each in a small region represented respectively by positions 737 and 738. In each bundle of rays coming from directions 705, 707 and 708, there is a chief-ray which pass through the center of the aperture stop 710. In the region between the sensor coverglass 728 and the image plane 730, generally an air space, the chief-rays hitting the image plane at 737 and 738 each have an incident angle with respect to the chief-ray hitting the image plane at 535, which is generally the optical axis of the system. This angle is often called the chief-ray angle. In some embodiments of miniature ultra-wide-angle lenses according to the present invention, the maximum chief-ray angle is over 20°, meaning that the rays hitting at 737 and 738 form a total opening angle of at least 40°. The lens also has an image footprint diameter 760, represented by the distance on the image plane 730 between the location 737 where the rays from direction 707 hit the image plane and the location 738 where the rays from direction 708 hit the image plane. In the example layout 700, the miniaturization ratio of these miniature ultra-wide-angle lens, defined as the ratio between the total track length 750 and the image footprint diameter 760 is equal to 0.6. For miniature ultra-wide-angle lenses according to the present invention, the miniaturization ratio is below 0.8 by using a focal length at least 10% smaller than what is required for the target distortion profile as will be explained with respect to FIG. 8. When the method according to the present invention is pushed further, the miniaturization ratio in extreme miniature wide-angle lenses is below 0.7. In some other embodiments, to achieve even smaller total track length for a required image diameter, the miniaturization ratio is below 0.6 or even below 0.5. For these extreme miniature ultra-wide-angle lenses, the focal length can be at least 15% smaller or even at least 20% smaller than what is required for the target distortion profile. Furthermore, with lenses designed according to the method of the present invention, a local telephoto ratio (LTR) can be defined as the ratio between the total track length (TTL) of the lens by the local focal length (LFL) of the lens. The local focal length is defined as the mathematical derivative $dH/d\theta$, where H is the image height in mm and $\theta$ is the field of view angle in radians and is equal the traditional effective focal length in the center, where the field of view angle is 0°. Since the local focal length has a defined value at each field of view angle, the local telephoto ratio also has a defined value that can vary with the field of view angle. With lenses designed according to the method of the present invention, the local telephoto ratio is higher in the center than at the field of view angle with the largest resolution by at least 10%. In other embodiments, this LTR is even at least 15% or at least 20% higher in the center than at the field of view with the maximum resolution in order to reach the desired miniaturization ratio.

Figure 8:
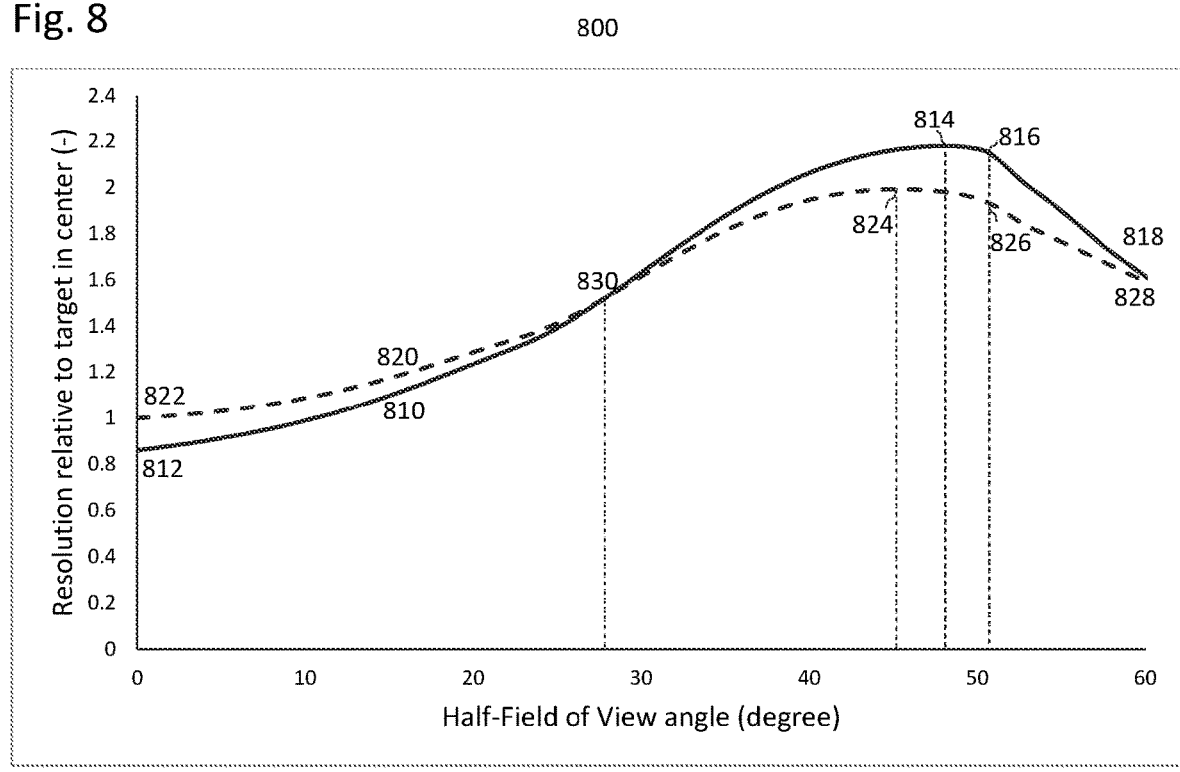
FIG. 8 shows an example resolution curve for a miniature 120° ultra-wide-angle lens having a miniaturization ratio <0.8 compared to the target resolution curve after image processing.

FIG. 8 shows a graph 800 of the normalized original resolution curve 810 (full line) for a 120° full field of view miniature ultra-wide-angle lens designed according to the method of the present invention in comparison to the target resolution curve 820 (dashed line) after image processing is used. This target resolution curve 820 also represents the case of an ultra-wide-angle lens not designed according to the method of the present invention to lower the miniaturization ratio as in FIG. 4. The value 812 represents the original resolution of the lens designed according to the method of the present invention in the center of the field of view and is at least 10% lower than the target resolution value 822 of the target resolution because the focal length is at least 10% smaller than what is required for the lens having the target projection. This create a zone of compression in the center of the image compared to the target projection. In some other embodiments of the current invention, for extreme miniature ultra-wide-angle lenses, since the focal length can be at least 15% smaller or even at least 20% smaller than what is required for the target projection, the designed lens original resolution 812 is at least 15% smaller than the target resolution 822 or even at least 20% smaller than the target resolution 822. Since the original resolution in the center is smaller than required for the target projection and the image sensor size is fixed, this smaller original resolution in the center creating a compressed zone in the center is combined with at least one zone of expansion in the remaining part of the field of view. With the example resolution curves 800 of FIG. 8, the original resolution curve 810 of the lens according to the present invention is equal to the target resolution curve 820 at a single location of equal resolution 830. This location of equal resolution 830 separates the zone of compression, located from the center of the field of view to this location of equal resolution 830, from the zone of expansion, located from this location of equal resolution 830 to the edge of the field of view. This case with only one location of equal resolution 830 where the original resolution of the designed miniature ultra-wide-angle lens and the target resolution curve are equal is just an example, but in other miniature ultra-wide-angle lenses designed according to the present method, there could be more than one such point, possibly creating more than one compressed zone or more than one expanded zone. In the expansion zone, there is at least one location where the resolution departure between the original resolution curve 810 for the designed miniature ultra-wide-angle lens and the target resolution curve 820 for the target projection is a local maximum. In this example of FIG. 8, the original resolution curve 810 for the designed miniature ultra-wide-angle lens has a maximum resolution at location 814 and the target resolution curve 820 for the target resolution has a maximum resolution at 824, but the location of a local maximum resolution departure, defined as the location where the difference between the resolution curve of the designed lens and the resolution curve of the target projection is a local maximum in %, is located at position 816 on the original resolution curve 810, corresponding to position 826 on the target resolution curve 820. This at least one local maximum resolution departure can be at any location in the expansion zone according to the present invention. In this example, at the edge of the field of view, where the half-field of view angle θ is equal to 60°, the resolution departure between original resolution 818 and target resolution 828 is not a local maximum, but it could also be the case in some other examples according to the present invention. At the location of at least one maximum resolution departure, the original resolution value 816 of the designed miniature ultra-wide-angle lens is at least 10% larger than the target resolution value 826. In extreme miniature ultra-wide-angle lenses, the original resolution value 816 at the maximum resolution departure could be at least 15% higher than the target resolution value 826 or even at least 20% higher than the target resolution value 826. The captured image on the image sensor with the original resolution curve 810 from the designed miniature ultra-wide-angle lens will then be processed to an image with the target resolution curve using the method that will be described with respect to FIG. 9 or FIG. 10.

Figure 9:
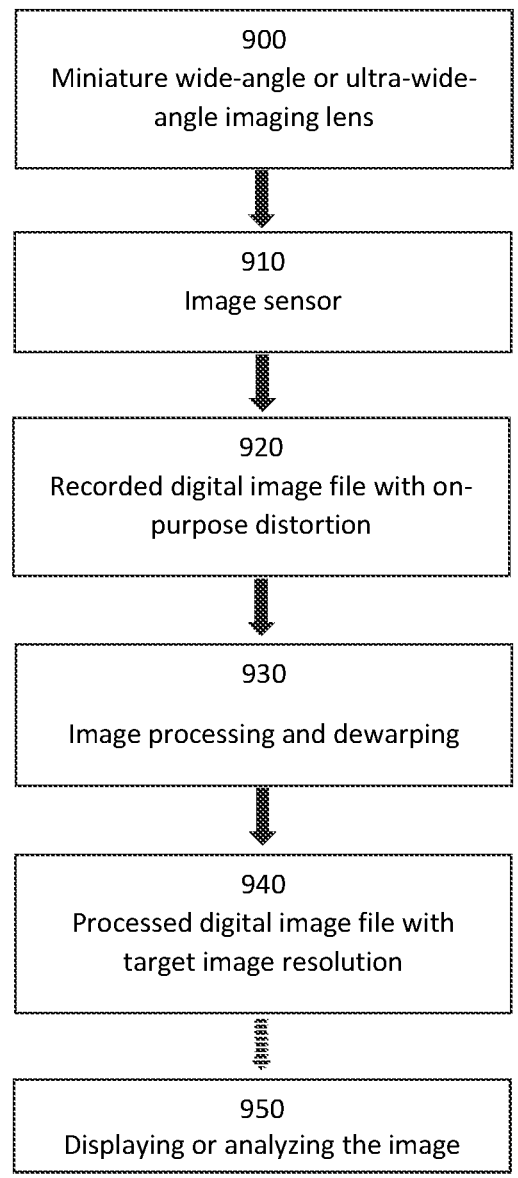
FIG. 9 shows the method for processing an image captured from an imager to an image with the target projection via image processing.

FIG. 9 shows the method for dewarping and processing an image captured from an imager according to the present invention to a processed image with the target projection when the processing is done by an algorithm unit. The first step 900 is using an imager comprising a miniature wide-angle or miniature ultra-wide-angle lens designed according to the method explained with respect to FIG. 5 to FIG. 8 and an image sensor. The miniature lens designed according to the method of the present invention forms an image in an image plane. At step 910, the image sensor of the imager, located close to the image plane of the miniature lens, transforms the optical image to an original digital image with on-purpose distortion. The image sensor can be of any kind, including charged-couple devices (CCD), complementary metal-oxide semiconductor (CMOS), Quantum-dot or the likes. In some embodiment according to the present invention, both the image plane from the optical system and image sensor could be curved instead of straight. At step 920, the digital image file with on-purpose distortion is either recorded on a hard-drive, a solid-state drive, a memory card or any other way of recording digital image files, including uploading it over the Internet to a cloud-based storage or transmitted directly to an image processor. The digital image file with original image resolution according to the present invention has on-purpose distortion compared to the target image resolution, creating a compressed zone in the center and at least one expanded zone in the rest of the field of view. At step 930, a dewarping and processing algorithm unit receives the original digital image file to dewarp it and also optionally further process it. This dewarping and processing algorithm can be adaptive using at least one of an external parameter, a user intent, a sensor output or the likes to adjust in real time the target resolution curve. In some other embodiments, instead of creating a digital image file and transmitting it to the processor, the image could be placed in a buffer to be directly processed by the processor without ever creating a digital image file. This algorithm unit can be a software code executed on a hardware processor or it can be a hardware device specifically programmed to execute this dewarping and processing. These include any hardware capable of transforming the digital image, including a computer, smartphone, tablet, Field-Programmable Gate Array (FPGA), Application-Specific Integrated Circuit (ASIC), System on Chip (SoC), any hardware consisting of a central processing unit (CPU) or a graphical processing unit (GPU) or the like. The dewarping part of the algorithm remove the on-purpose distortion in the image from the designed miniature lens having original resolution curve to obtain an image with the targeted resolution curve. An optional processing part of the algorithm can further improve the output image by adjusting the sharpness, contrast, brightness, white balance, denoise or any other image improvement operation on the image. The output of the algorithm is the step 940 with the processed digital image file dewarped to the target image resolution. This processed and dewarped digital image file can then be optionally displayed at step 950 on an image display device, including a computer screen, a television screen, a tablet screen, a smartphone screen, any other type of screen, by printing it or with any other display device capable of showing the processed and dewarped image to a human observer. Alternatively, the output image from the algorithm unit with the targeted resolution curve could be used by a further calculation unit. This calculation unit is any computer capable of analyzing automatically the processed and dewarped digital image file without displaying it to a human observer, including analyzing the image by an artificial intelligence network trained or not via deep learning techniques.

Figure 10:
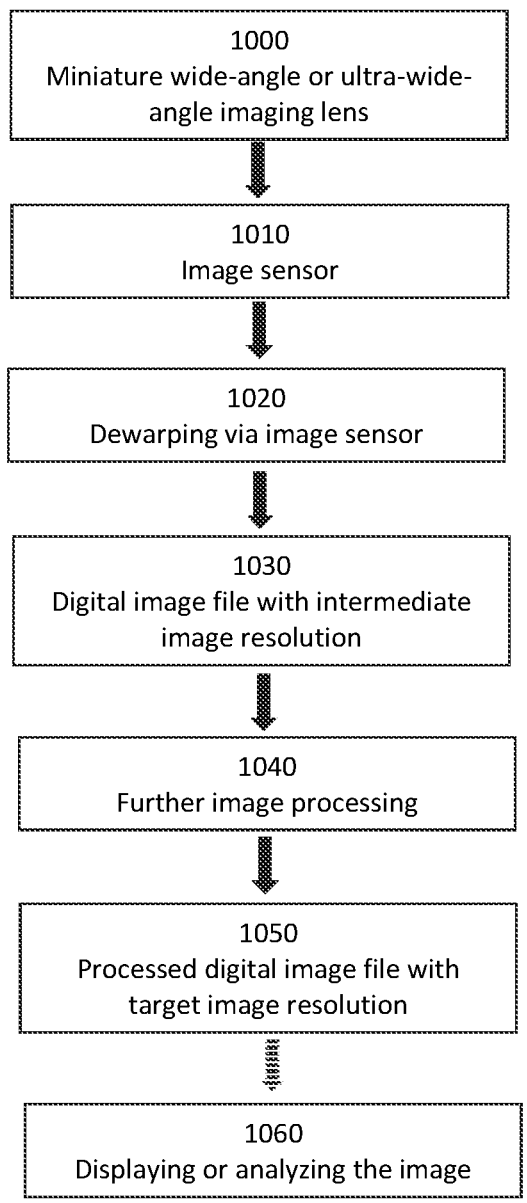
FIG. 10 shows the method for transforming an image captured from an imager to an image with the target projection via the image sensor and the processing unit.

FIG. 10 shows the method for dewarping an image captured from an imager according to the present invention to a processed image with an intermediate resolution curve with the image sensor and then further processing the resulting image with an algorithm unit to get a processed image with the target resolution curve. The first step 1000 is using an imager comprising a miniature wide-angle or ultra-wide-angle lens designed according to the method explained with respect to FIG. 5 to FIG. 8 and an image sensor. The miniature lens designed according to the method of the present invention forms an image in an image plane. At step 1010, the image sensor of the imager, located close to the image plane of the miniature lens, receive the optical image with the original resolution curve. The image sensor can be of any kind, including charged-couple devices (CCD), complementary metal-oxide semiconductor (CMOS), Quantum-dot or the likes. In some embodiment according to the present invention, both the image plane from the optical system and image sensor could be curved instead of straight. At step 1020, the image sensor dewarp the image and transform it to a dewarped digital image having an intermediate resolution curve. This dewarping by the image sensor can be of any kind, including dewarping by changing the output during the reading of the pixels, using smart binning, using sensors pixels of different size, or the likes. In more details, when the dewarping is done directly by transforming the pixels read during a line by line scanning, a circle by circle scanning or any other type of scanning of the pixels, the output signal from the sensor is not 1:1 the same as the order it is read and the output signal is already dewarped. One other way the sensor can do the dewarping directly is by smart binning, in which the image sensor can for example apply a different binning in the center than at the edge. It could be a 1×1 pixel (no binning) in the center and increasing to 1.5×1.5 pixels or 2×2 pixels toward the edges, for example. The smart binning could also use non-symmetrical binning, like a 1×2 or a 2×1 pixels binning. By doing this smart binning at the analog sensor level instead of by software image processing, the resulting signal over noise ratio is improved because there is more light collected by effective pixel area, helping to compensate the lower relative illumination toward the edges of these lenses with on-purpose distortion. Similarly, the dewarping could be done by the sensor by using an image sensor with pixels of increasing size toward the edge. For example, the pixels in the center could be square of 1×1 μm, but toward the edge the size could be larger than 1 μm or the shape could be different from square pixels. Next, at step 1030, the output from the image sensor is a digital image file which has the intermediate image resolution following the dewarping by the image sensor. This digital image file can then optionally be transferred to a processor for further processing at step 1040 to transform the resolution curve from the intermediate resolution curve to the target resolution curve. In some embodiment according to the present invention, the intermediate resolution curve after dewarping by the image sensor is already equal to the target resolution curve and no further image resolution transformation by the processing unit is required. Again, in some other embodiments, instead of creating a digital image file and transmitting it to the processor, the image could be placed in a buffer to be directly processed by the processor without ever creating a digital image file. The output from the processor at step 1050 is a processed and dewarped digital image file that can then be optionally displayed at step 1060 on an image display device, including a computer screen, a television screen, a tablet screen, a smartphone screen, any other display screen, by printing it or with any other display device capable of showing the processed and dewarped image to a human observer. Alternatively, the output image from the algorithm unit could be used by a further calculation unit. This calculation unit is any computer capable of analyzing automatically the processed and dewarped digital image file without displaying it to a human observer, including analyzing the image by an artificial intelligence network trained or not via deep learning techniques. This dewarping and processing algorithm can be adaptive using at least one of an external parameter, a user intent, a sensor output or the likes to adjust in real time the target resolution curve.

Figure 11:
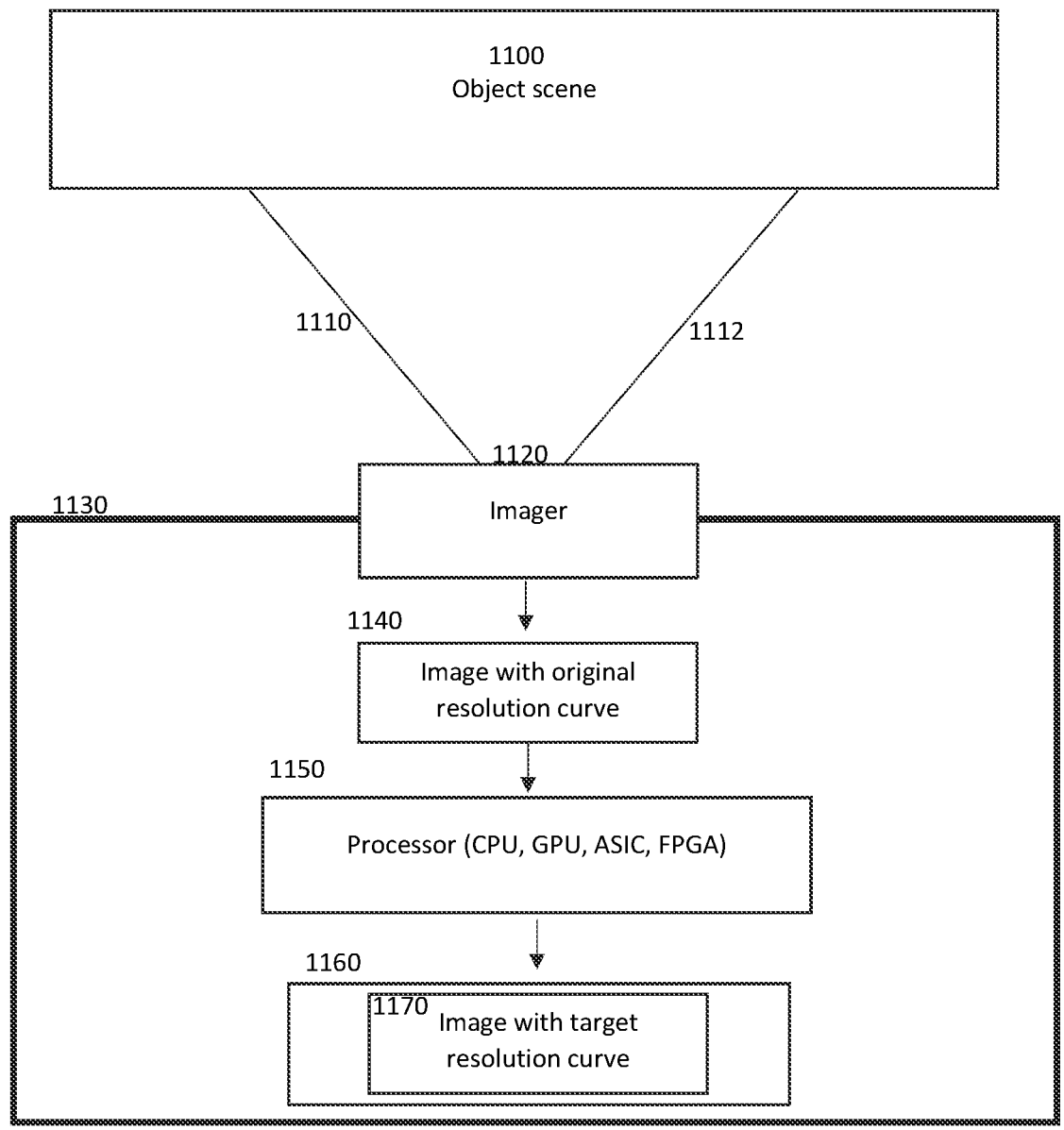
FIG. 11 shows an example embodiment of a physical device capturing an image with original resolution, processing it and outputting the processed image with the target resolution.

FIG. 11 shows an example embodiment of a physical device 1130 capturing the original image with original resolution, processing it according to the method of the present invention and outputting the processed image with the target resolution on a display screen. The object scene 1100 is visible by the imager 1120 of the physical device 1130. This physical device could be any device comprising a way to receive an original wide-angle image, process it and optionally display it, like a smartphone, a tablet, a laptop or desktop personal computer, a portable camera, or the likes. The imager has a total field of view, the angular opening looking at the object, schematized by the extreme rays 1110 and 1112. For the imagers according to the present invention, the field of view is generally larger than 60°, but this is not an absolute requirement according the present invention and some imager with smaller field of view angles could be used. In this example embodiment, the imager consists of at least one optical system and at least one image sensor. In other embodiments, the imager could consist of any other ways of creating a digital image, including other optical system with lens, mirrors, diffractive elements, meta-surfaces or the likes or any processor creating or generating a digital image file from any source. The optical system is this example embodiment is a wide-angle lens made of multiple rotationally symmetrical optical lens elements, but in other embodiments, it could also comprise at least one freeform element to have a non-rotationally symmetrical image footprint. The image sensor is located as close as possible to the image plane of the optical system, converting the optical image from the lens having original resolution to a digital image file with original resolution 1140. The physical device 1130 also comprise a processor 1150 configured to receive the original digital image file 1140, the information about the original resolution curve and the information about the target resolution curve and configured to process the original digital image file 1140 in order to create a processed image 1170 by transforming the resolution curve from the original resolution curve to the target resolution curve. In this example, the processor 1150 is a central processing unit (CPU), but in other embodiments, the processing could be done by any kind of processor, including a CPU, a GPU, a TPU, an ASIC, a FPGA or any other hardware processor configured to execute software algorithm for performing the stated functions or able to process digital image files. In this example with a physical device 1130, the processed image 1170 is then displayed on a screen 1160 for a human observer to look at it. This example of a single physical device 1130 comprising the imager 1120, the processor 1150 and the display 1160 is just an example embodiment according to the present invention, but these three features could also be part of multiple physical devices with the digital image file exchanged between them via any communication link to share digital image file, including, but not limited to, a computer main bus, a hard drive, a solid-state drive, a USB drive, transferred over the air via Wi-Fi or any other way of transferring digital image file between multiple physical devices.

In some other embodiments according to the present invention, the optical system comprises at least one freeform optical element without rotational symmetry around an optical axis. The resulting image is then not of a symmetrical disk shape. In this case, we can still define a miniaturization ratio as the ratio of the total track length divided by the full image dimension, where the full image dimension is calculated as the distance from the pair of image points on the image plane separated by the largest distance, even if this distance is larger than the diagonal of the image sensor located in the image plane. In these embodiments, the freeform surface can be of any shape, including surfaces defined by polynomial series in X and in Y or in other similar coordinate system, cylindrical elements having different curvatures in two axes, toroidal elements, surfaces defined point by point with their sag, slope or curvature by a grid or a table, 2D spline or NURBS surfaces, surfaces defined by Zernike or Chebyshev polynomials, pedal surfaces or any other custom mathematical surface that can be used to describe a freeform surface. In these embodiments without rotational symmetry the original resolution curve and the target resolution curve can be defined on any straight lines across the image plane in which a compressed and an expanded zone is present in the original resolution curve compared to the target resolution curve.

In some other embodiments according to the present invention, instead of using a single optical system, creating a single image, the imager comprises of multiple optical systems, each of the optical systems creating a separate image on at least one image sensor. In some embodiments, this case with at least one image sensor could share the same optical path in some optical elements before being split in several optical path by a specific optical element separating the optical path in more than one path like a prism, a micro-lens array, a diffractive element, or the likes, creating multiple image on one or several image sensor. In some other embodiments, this could be several completely different optical lenses having no optical element in common and each forming their own image side by side on one image sensor or on several image sensors. In all of these cases, when the image plane is common, we can still define a miniaturization ratio as the ratio of the total track length divided by the full image dimension, where the full image dimension is calculated as the distance from the pair of image points on an image plane separated by the largest distance, even if this distance is larger than the diagonal of the image sensor located in the image plane. In the cases of multiple image sensors having multiple image planes, a separate miniaturization ratio can be calculated in the same way for each image plane and at least one optical system is miniature according to the method of the present invention.

In some other embodiments according to the present invention, the large positive distortion added on purpose to the optical lens has a consequence of spreading a given amount of light on a larger area on the image plane, resulting in a lower relative illumination in that region of the image. The relative illumination is defined as the quantity of light hitting the image plane at a given position relative the quantity of light hitting the image plane at a maximum illumination location, often the center of the field of view. To avoid having a relative illumination toward the edge that is too low and that could create visible difference of illumination between the center and the edge of the field of view or create a region of the image with too much image noise because the sensor gain had to be increased to compensate the lower relative illumination, the lens according to the present invention can be used with a non-uniform light transmitter that block on purpose some of the rays in a region where the illumination ix maximum in order to reduce the quantity of light in that region. This allows to reduce the difference of light between the region of maximum illumination and the region of minimum illumination, equalizing the relative illumination curve. This non-uniform light transmitter could be an anti-reflection coating having on-purpose a lower efficiency in a region, an additional optical element added for the purpose of reflecting or absorbing more rays in a region or any other optical way to limit on purpose the illumination in a region in order to better balance the quantity of light to result in a more uniform relative illumination.

In some embodiments according to the present invention, the optical system designed with on-purpose distortion is used to compensate a drop of image quality toward the edge of the field of view in addition to reaching a smaller miniaturization ratio. This allows to reduce the difference of image quality across the image. Wide-angle and ultra-wide-angle optical systems generally have decreasing image quality going from the center to the edge of the image footprint due to off-axis aberrations becoming more and more important. With the zone of compression in the center of the image and the at least one zone of expansion toward the edge of the image, the image quality after image dewarping from the original resolution to the target resolution has the effect of expanding the image in the originally compressed zone and compressing the image in the originally expanded zone. In the originally compressed zone, the image quality was already high and a digital expansion in that part of the image still offer good overall image quality in this region. In the originally expanded zone, the image quality was lower and a digital compression in that part of the image make the lower image quality less visible by displaying several original pixels of information on fewer dewarped image pixels. This effect helps to balance the image quality in the image.

In an alternate embodiment of the present invention, the optical system is a projection system instead of an imaging system. In that case, the miniaturization is defined by the ratio of the total track length by the object footprint diameter on the object plane. Then, the same idea of using distortion on-purpose in order to get a smaller miniaturization ratio is also possible according to the method of the present invention.

All of the above are figures and examples show the miniature mobile phone lens with on-purpose distortion. In all these examples, the imager, camera or lens can have any field of view, from very narrow to extremely wide-angle. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for creating a processed image having a target resolution using an imaging device comprising an imager and a processing unit, the imager comprising a miniature optical system and an image sensor, the method comprising:
   a. creating, using the miniature optical system, an optical image of a scene in an image plane, the optical image having an original resolution curve;
   b. converting, by the image sensor, the optical image to an original digital image file having the original resolution curve;
   c. receiving, by the processing unit, the original digital image file, information about the original resolution curve and information about a target resolution curve; and
   d. processing, by the processing unit, the original digital image file in order to create a processed image, the processing unit transforming the original resolution curve to the target resolution curve;

wherein the miniature optical system has a miniaturization ratio, defined as a ratio between a total track length and an image footprint diameter, the miniaturization ratio being smaller than 0.8, wherein the original resolution curve is different than the target resolution curve, wherein the original resolution curve has a value smaller than a corresponding value of the target resolution curve in a center of a field of view, and wherein, at a maximum resolution departure location, defined as a location where a difference between the original resolution curve and the target resolution curve is at a maximum, the target resolution curve has a value smaller than a corresponding value of the original resolution curve.

2. The method of claim 1, further comprising:
e. outputting, by the processing unit, the processed image.

3. The method of claim 1, wherein the original resolution curve and the target resolution curve have at least one point of equal resolution, the point of equal resolution separating a compressed zone from an expanded zone.

4. The method of claim 1, wherein the miniature optical system is an optical lens made of a combination of multiple optical elements, each optical element being made from one of glass, plastic or crystal material.

5. The method of claim 1, wherein the miniature optical system is wide-angle with a total field of view larger than 60°.

6. The method of claim 1, wherein the miniature optical system comprises at least one freeform optical element.

7. The method of claim 1, wherein the imager comprises multiple optical systems, each of the optical systems creating a separate image.

8. The method of claim 1, wherein transforming the original resolution curve to the target resolution curve reduces an image quality difference across the processed image.

9. The method of claim 1, wherein the target resolution curve is adjusted using at least one of an external parameter, a user intent or a sensor output.

10. A method for creating a processed image having a target resolution using an imaging device comprising an imager and a processing unit, the imager comprising a miniature optical system and an image sensor, the method comprising:
 a. creating, using the miniature optical system, an optical image of a scene in an image plane, the optical image having an original resolution curve;
 b. converting, by dewarping with the image sensor, the optical image to an original digital image file having an intermediate resolution curve;
 c. receiving, by the processing unit, the original digital image file, information about the intermediate resolution curve and information about a target resolution curve; and
 d. processing, by the processing unit, the original digital image file in order to create a processed image, the processing unit transforming the intermediate resolution curve to the target resolution curve;
wherein the miniature optical system has a miniaturization ratio, defined as a ratio between a total track length and an image footprint diameter, the miniaturization ratio being smaller than 0.8, wherein the original resolution curve is different than the target resolution curve,
wherein the original resolution curve has a value smaller than a corresponding value of the target resolution curve in a center of a field of view, and wherein, at a maximum resolution departure location, defined as a location where a difference between the original resolution curve and the target resolution curve is at a maximum, the target resolution curve has a value smaller than a corresponding value of the original resolution curve.

11. The method of claim 10, further comprising:
e. outputting, by the processing unit the processed image.

12. The method of claim 10, wherein the original resolution curve and the target resolution curve have at least one point of equal resolution, the point of equal resolution separating a compressed zone from an expanded zone.

13. The method of claim 10, wherein the miniature optical system is an optical lens made of a combination of multiple optical elements, each optical element being made from one of glass, plastic or crystal material.

14. The method of claim 10, wherein the miniature optical system is wide-angle with a total field of view larger than 60°.

15. The method of claim 10, wherein the miniature optical system comprises at least one freeform optical element.

16. The method of claim 10, wherein the miniature optical system comprises a non-uniform light transmitter.

17. The method of claim 10, wherein transforming the original resolution curve to the target resolution curve reduces an image quality difference across the processed image.

18. The method of claim 10, wherein the target resolution curve is adjusted using at least one of an external parameter, a user intent or a sensor output.

19. The method of claim 10, wherein the intermediate resolution curve is equal to the target resolution curve.

20. An imaging device to create a processed image having a target resolution, the imaging device comprising:
 a. an imager comprising:
 i. a miniature optical system, configured to create an optical image of a scene in an image plane, the optical image having an original resolution curve, and
 ii. an image sensor, configured to convert the optical image to an original digital image file having an original resolution curve; and
 b. a processor configured to:
 iii. receive the original digital image file, information about the original resolution curve and information about a target resolution curve, and
 iv. process the original digital image file in order to create a processed image by transforming the original resolution curve to the target resolution curve,
wherein the miniature optical system has a miniaturization ratio, defined as a ratio between a total track length and an image footprint diameter, the miniaturization ratio being smaller than 0.8, wherein the original resolution curve is different than the target resolution curve,
wherein the original resolution curve has a value smaller than a corresponding value of the target resolution curve in a center of a field of view, and
wherein, at a maximum resolution departure location, defined as a location where a difference between the original resolution curve and the target resolution curve is at a maximum, the target resolution curve has a value smaller than a corresponding value of the original resolution curve.

* * * * *